(No Model.)

F. KRAUSE & K. HEINE.
CANDLE HOLDER FOR CHRISTMAS TREES.

No. 601,397. Patented Mar. 29, 1898.

WITNESSES:

INVENTORS:
FEODOR KRAUSE &
KURT HEINE,
BY
Fred C. Fraentzel,
ATTORNEY.

UNITED STATES PATENT OFFICE.

FEODOR KRAUSE AND KURT HEINE, OF NEWARK, NEW JERSEY.

CANDLE-HOLDER FOR CHRISTMAS TREES.

SPECIFICATION forming part of Letters Patent No. 601,397, dated March 29, 1898.

Application filed May 26, 1897. Serial No. 638,194. (No model.)

*To all whom it may concern:*

Be it known that we, FEODOR KRAUSE and KURT HEINE, citizens of the United States, residing at Newark, in the county of Essex and State of New Jersey, have invented certain new and useful Improvements in Candle-Holders for Christmas Trees, &c.; and we do hereby delare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in candle-holders for use on Christmas trees or other like use; and the invention has for its primary object to provide a holder in the form of a bracket provided with a screw end and means for turning it, whereby the bracket can be permanently fixed in the stem of the tree and the candle held in a perfectly vertical or upright position.

A further object of our invention is to provide an adjustable candle-holder for Christmas trees or the like whereby the holder can be arranged in any part of the stem of the tree and its parts adjusted to bring the candle-holding portion out near the edge of the tree.

The invention is further designed to provide a simply and cheaply constructed device which is neat in appearance, can be easily applied and readily adjusted, and provides a safe means for the arranging of the candles to avoid all danger of fire, as well as that of the candles being thrown from the tree when a person accidentally brushes up against the latter.

This invention therefore consists in the novel arrangements and combinations of parts to be hereinafter fully described, and finally embodied in the clauses of the claim.

The invention is illustrated in the accompanying drawings, in which—

Figure 1:
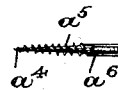
Figure 1:
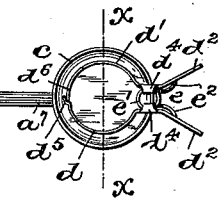
Figure 2:
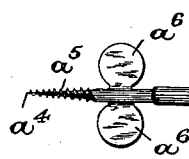
Figure 2:
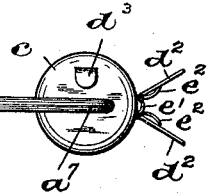
Figure 3:
Figure 4:
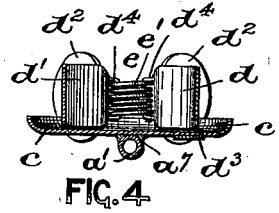
Figure 5:
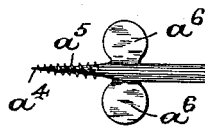
Figure 5:
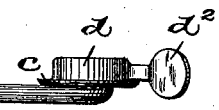

Figure 1 is a plan or top view of our novel form of candle-holder. Fig. 2 is a part side view and part longitudinal vertical section of the same, and Fig. 3 is a bottom view of the candle-holder. Fig. 4 is a vertical cross-section of the candle-supporting portion of the device, said section being on a slightly-enlarged scale and taken through line $x$ in Fig. 1. Fig. 5 is a side view of a candle-holder of a modified form of construction, but still embodying the leading features of our present invention.

Similar letters of reference are employed to indicate corresponding parts in all of the above-described views.

In the said views, A indicates the complete candle-holder, which consists, essentially, of a pair of telescopically-arranged parts $a$ and $a'$, substantially as illustrated in Figs. 1, 2, and 3.

As will be seen from Fig. 2, the part $a'$ of the device is provided with a downwardly-projecting pin or stud $a^2$, which fits into a longitudinal slot $a^3$ in the part $a$ to permit of a movement of the part $a'$ lengthwise within the tubular part for adjustment, but to also prevent any rotary motion of said part $a'$ within the part $a$, as will be clearly understood. The forward end of said tubular part is pointed, as at $a^4$, and is provided with a screw-thread $a^5$, whereby the candle-holder can be suitably secured in position on the trunk of the tree. Said pointed part $a^4$ may also be provided behind said screw-threaded portion with a means for turning said portion $a$, said means consisting, essentially, of a pair of wings or finger-pieces $a^6$.

To prevent the part $a'$ from being entirely withdrawn from the part $a$, said part $a$ is provided with a suitable collar or ring $b$, which acts as a stop for the pin or stud $a^2$, as will be clearly understood.

The forward end $a^7$ of the part $a'$ is provided with a suitable sheet-metal saucer $c$, which may be soldered or otherwise secured on said end.

Secured upon the saucer $c$ to hold a candle therein in an upright position is a suitable holding-clamp, consisting, essentially, of a pair of spring-actuated holding or clamping jaws $d$ and $d'$, provided with suitable operating or finger pieces $d^2$, as clearly illustrated in the several figures of the drawings. One of said jaws, as $d$, is provided with a lip $d^3$, which is passed through an opening in said saucer $c$ and is turned over on the back thereof, as clearly illustrated in Fig. 4, whereby the holding-clamp for the candle is secured in its operative position on said saucer. Each jaw $d$ and $d'$ of said holding-clamp is provided with suitable lugs $d^4$, which are bent around the coils $e'$ of a spring $e$, substantially as shown. The free ends $e^2$ of said spring are in operative engagement with the backs of said finger-pieces $d^2$, whereby said jaws $d$ and $d'$ are forced together to hold the candle in its upright position securely between them. The shape of said jaws $d$ and $d'$ is preferably such that when they are viewed from the top they will form a complete circular band, as clearly shown in Fig. 1, said jaw $d$ being formed at its free end with a suitable offset $d^5$, into which the end $d^6$ of the jaw $d'$ fits, as illustrated in Fig. 1.

In Fig. 5 we have illustrated a slightly-modified form of construction of candle-holder in which the parts are not telescopically arranged, employing in place of the two parts $a$ and $a'$ but a single bar $a^8$. The other parts of the device illustrated in said Fig. 5 are similar to those described hereinabove in connection with the other figures of the drawings and need, therefore, not be here set forth in detail. This construction of candle-holder illustrated in Fig. 5 is not adjustable, and the device illustrated in Figs. 1, 2, and 3 is the preferred form of construction.

Of course it will be evident that changes may be made in the minor arrangements and combinations of the parts without departing from the scope of our invention. Hence we do not limit ourselves to the exact arrangements and combinations of the parts as herein described, and illustrated in the accompanying drawings.

Having thus described our invention, what we claim is—

1. As an improved article of manufacture, a candle-holder for Christmas trees, &c., consisting, essentially, of a bar, having a screw portion at one end and wings $a^6$ formed integrally with said bar and directly behind said screw portion for turning said bar, and a candle-supporting device at the other end of the bar, consisting, of a saucer $c$ having an opening therein, a jaw $d$ provided with a finger-piece and a lip $d^3$ which is passed through said opening in the saucer and is turned down on the back thereof for securing said jaw $d$ in a fixed position on said saucer, a second jaw $d'$ also provided with a finger-piece, said jaw $d'$ being pivotally connected with the jaw $d$, and a spring $e$ for operatively connecting said jaws, substantially as and for the purposes set forth.

2. As an improved article of manufacture, a candle-holder for Christmas trees, &c., consisting, essentially, of a tubular bar $a$ having a screw portion and wings $a^6$ formed integral therewith and directly behind said screw portion for turning said bar, a slot $a^3$ in said bar and a ring $b$ thereon, a bar $a'$ adapted to slide within said bar $a$, having a pin or stud $a^2$ projecting into said slot $a^3$, and a candle-supporting device on said bar $a'$, consisting, of a saucer $c$ having an opening therein, a jaw $d$ provided with a finger-piece and a lip $d^3$ which is passed through said opening in the saucer and turned down on the back thereof for securing said jaw $d$ in a fixed position on said saucer, a second jaw $d'$ also provided with a finger-piece, said jaw $d'$ being pivotally connected with the jaw $d$, and a spring $e$ for operatively connecting said jaws, substantially as and for the purposes set forth.

In testimony that we claim the invention set forth above we have hereunto set our hands this 24th day of May, 1897.

FEODOR KRAUSE.
KURT HEINE.

Witnesses:
FREDK. C. FRAENTZEL,
WM. H. CAMFIELD, Jr.